United States Patent [19]
Maeda et al.

[11] Patent Number: 4,476,266
[45] Date of Patent: Oct. 9, 1984

[54] THERMOPLASTIC RESIN COMPOSITIONS

[75] Inventors: Tetsuro Maeda; Susumu Ohoka; Masafumi Shingai; Haruo Igawa, all of Ichihara, Japan

[73] Assignee: Denki Kagaku Kogyo Kabushiki Kaisha, Tokyo, Japan

[21] Appl. No.: 440,491

[22] Filed: Nov. 10, 1982

[30] Foreign Application Priority Data

Apr. 16, 1980 [JP] Japan ................................. 55-49860

[51] Int. Cl.³ .............................................. C08L 55/02
[52] U.S. Cl. ...................................... 524/128; 525/83; 525/84
[58] Field of Search .............................. 525/83, 84, 86

[56] References Cited
U.S. PATENT DOCUMENTS 3,883,614  5/1975  Carrock ................................. 525/83

FOREIGN PATENT DOCUMENTS 56-147841 11/1981 Japan ..................................... 525/84

Primary Examiner—Carman J. Seccuro
Attorney, Agent, or Firm—Albert L. Jeffers; Douglas L. Miller

[57] ABSTRACT (1) A graft copolymer latex obtained by the copolymerization of a rubbery diene polymer latex with an aromatic vinyl monomer and an acrylic monomer is mixed with (2) a copolymer latex having a glass transition point of $-40°$ to $10°$ C. and a volume-average particle size of at least $0.5\mu$ obtained by the copolymerization of an olefin with a vinyl ester of a fatty acid while they are maintained in the form of latex to precipitate a solid resin, whereby a thermoplastic resin composition is obtained. The total solid resin contains at least 11 wt. % of the rubbery diene polymer and at least 1 wt. % of the copolymer of olefin/vinyl ester of fatty acid.

19 Claims, No Drawings

THERMOPLASTIC RESIN COMPOSITIONS

BACKGROUND OF THE INVENTION

The present invention relates to a thermoplastic resin. More particularly, the invention relates to a thermoplastic resin composition having excellent rigidity, moldability and surface gloss and improved impact resistance and environmental stress crack resistance.

There have been proposed various processes for improving impact strength or environmental stress crack resistance of thermoplastic resins by dispersing polymer particles having a rubbery elasticity therein. For example, rubber-modified thermoplastic resins such as ABS resin are prepared by the graft copolymerization of a polymer having a rubbery elasticity with a thermoplastic resin or by the polymer blending. In the preparation of the rubber-modified thermoplastic resins, a conjugated diene polymer; a copolymer of the conjugated diene monomer with a monomer such as styrene, acrylonitrile, methacrylate ester or acrylate ester; an amorphous olefin polymer; or a polymer having a quite low glass transition temperature such as an acrylate ester polymer is used as the rubbery polymer to improve the impact resistance and environmental stress crack resistance.

Various other processes have been proposed for improving the impact resistance or environmental stress crack resistance of said resin. For example, there have been proposed a process wherein the rubbery polymer content is increased, a process wherein a polymer having a low glass transition temperature is used, a process wherein a material having a large particle size is used and a process wherein a material having a large particle size is used in combination with a material having a small particle size. However, the degree of the improvement in impact resistance or environmental stress crack resistance has been limited, since physical properties such as rigidity, moldability and surface gloss are deteriorated by the treatment because of a low glass transition temperature of the rubbery polymer.

Further, there has been proposed a process for improving the environmental stress crack resistance by mechanically blending ABS resin with vinyl acetate polymer by an ordinary blending technique as disclosed in the specification of U.S. Pat. No. 3,883,614. However, the resin composition obtained by mechanically blending ABS resin with vinyl acetate polymer has yet insufficient environmental stress crack resistance even after the treatment and its impact strength is not yet improved.

There has also been known a rubber-modified thermoplastic resin obtained by copolymerizing ethylene with vinyl acetate in the presence of a diene rubber polymer and then copolymerizing the resulting graft copolymer latex with styrene and acrylonitrile. However, this resin has an insufficient polymerization stability and the improvement in environmental stress crack resistance thereof is yet unsatisfactory.

SUMMARY OF THE INVENTION

An object of the present invention is to provide a rubber-modified theremoplastic resin which can be molded into moldings having improved impact resistance and environmental stress crack resistance in addition to properties of ordinary rubber-modified thermoplastic resins such as rigidity, moldability and surface gloss.

The present invention provides a thermoplastic resin composition obtained by mixing:

(A) a graft copolymer latex obtained by the copolymerization of a rubbery diene polymer latex with an aromatic vinyl monomer and an acrylic monomer with (B) a latex obtained by the emulsion polymerization of an olefin monomer with a monomeric vinyl ester of fatty acid and, if necessary, a vinyl monomer copolymerizable with them and having a glass transition temperature of $-40°$ to $10°$ C. and a volume-average particle size of at least $0.5\mu$, while they are maintained in the form of a latex to precipitate a solid resin, in which composition, the amount of the solid resin (EVA) in component (B) is at least 1 wt. % based on the total solid resin and that of the solid rubbery diene polymer (BR) is at least 11 wt. % and they satisfy the following relationship:

$$EVA < -3BR + 85.$$

DETAILED DESCRIPTION OF THE INVENTION

As the rubbery diene polymer latex (A) used in the present invention, there may be mentioned polymers prepared from diene monomers such as butadiene, isoprene, dimethylbutadiene and chloroprene as well as copolymers of these diene monomers with monomers copolymerizable with them, such as styrene, α-methylstyrene, acrylonitrile, methyl methacrylate and acrylate esters. These rubbery diene polymers may be used either alone or in the form of a mixture of two or more of them.

As the aromatic vinyl monomers to be graft-polymerized with the rubbery diene polymer latex, there may be mentioned, for example, styrene, α-methylstyrene, o-methylstyrene, m-methylstyrene, p-methylstyrene, t-butylstyrene, monochlorostyrene and dichlorostyrene. As the acrylic monomers to be graft-copolymerized, there may be mentioned, for example, acrylonitrile, methacrylonitrile, acrylate esters and methacrylate esters. They may be used either alone or in the form of a mixture of them.

The emulsion graft copolymerization can be carried out by a known method without any limitation.

The latex (B) is a copolymer latex obtained by emulsion-polymerizing the olefin monomer with the vinyl ester of fatty acid or by emulsion-polymerizing the olefin monomer with the fatty acid ester and a vinyl monomer copolymerizable with them.

The olefin monomers include ethylene, propylene, 1-butene, 2-butene, isobutylene, cyclopentene, cyclohexene and norbornene.

As the monomeric vinyl esters of fatty acids, there may be mentioned, for example, vinyl formate, vinyl acetate, vinyl buryrate, vinyl trimethylacetate and vinyl chloroacetate.

As the other vinyl monomers copolymerizable with these monomers, there may be mentioned aromatic vinyl monomers such as styrene, α-methylstyrene, o-, m- and p-methylstyrenes, t-butylstyrene, monochlorostyrene and dichlorostyrene; acrylic monomers such as acrylonitrile, methacrylonitrile, acrylate esters and methacrylate esters; halogenated olefins such as vinyl chloride; and vinyl ethers such as methyl vinyl ether, ethyl vinyl ether and phenyl vinyl ether.

If necessary, a polyfunctional vinyl monomer may be used in addition to the above combination. As the polyfunctional vinyl monomers, there may be mentioned, for example, ethylene glycol dimethacrylate, 1,3-butylene glycol dimethacrylate, 1,4-butylene glycol dimethacrylate, propylene glycol dimethacrylate and divinylbenzene.

In the present invention, the rubber-modified thermoplastic resin to be further modified should be mixed with the fatty acid vinyl ester polymer as a modifier while they are maintained in the form of the latex.

If the rubber-modified thermoplastic resin and fatty acid vinyl ester polymer recovered from the latex via an independent precipitation step are then extruded and mechanically mixed by calendering or Banbury mixing method and molded, the resulting moldings have an insufficient degree of improvement in impact strength and environmental stress crack resistance as shown in comparative examples given below and in this case a practically desirable reproducibility cannot be obtained.

Further, it is desirable that component (B), i.e., the fatty acid vinyl ester polymer latex, to be mixed with the rubber-modified thermoplastic resin has a volume-average particle size of at least $0.5\mu$. If it is less than $0.5\mu$, the degree of the improvement in the impact strength and environmental stress crack resistance is insufficient.

The fatty acid vinyl ester polymer has a glass transition temperature in the range of $-40°$ to $10°$ C., preferably $-20°$ to $5°$ C. If this temperature is below $-40°$ C., the properties of the product such as rigidity, moldability and surface gloss are deteriorated and, on the other hand, if it exceeds $10°$ C., the impact strength is deteriorated. As the monomers constituting the fatty acid vinyl ester polymers, there may be used olefin monomers, fatty acid vinyl ester monomers and other copolymerizable vinyl monomers. The monomers should be selected from them so as to satisfy the above-mentioned conditions of the glass transition temperature of the fatty acid vinyl ester polymer obtained by the polymerization for effectively attaining the object of the present invention by employing the combination of the monomers and selecting the ratio of them.

In the resin composition of the invention, it is important that the weight percentage, based on the total solid resin, of the solid resin in component (B) (hereinafter referred to as EVA) and that of the solid rubbery diene polymer in component (A) (hereinafter referred to as BR) are controlled in suitable ranges. EVA is at least 1% and preferably at least 5.5%. If EVA is less than 1%, the improvement of not only the environmental stress crack resistance but also impact resistance is insufficient. BR is at least 11%, preferably at least 13%. If BR is less than 11%, the desirable impact resistance cannot be obtained. There has been found a certain relationship between EVA and BR. According to the inventors' experiments, they should satisfy the following condition:

$$EVA < -3BR + 85$$

If this condition is not satisfied, the degree of improvement in the environmental stress crack resistance goes beyond the limit and the rigidity is deteriorated remarkably.

The solid resin is precipitated from the latex of the mixture of components (A) and (B) by adding an aqueous solution of one or more of precipitating agents such as hydrochloric acid, sulfuric acid, potassium chloride, sodium chloride, magnesium chloride, calcium chloride, aluminum chloride, potassium sulfate, sodium sulfate, magnesium sulfate and aluminum sulfate, then heating the mixture under stirring, dehydrating the same, washing the dehydrated product with water and drying the same.

In the present invention, a copolymer (component (C) comprising an acrylic monomer and an aromatic vinyl monomer may be incorporated in the above-mentioned polymer mixture. The acrylic monomers herein include, for example, acrylonitrile, methacrylonitrile, acrylate esters and methacrylate esters.

The aromatic vinyl monomers include, for example, α-methylstyrene, o-methylstyrene, m-methylstyrene, p-methylstyrene, t-butylstyrene, monochlorostyrene and dichlorostyrene. When ABS resin is used as the component (A), acrylonitrile/styrene copolymer is used preferably as the copolymer [component (C)].

In case the copolymer (C) is incorporated in the polymer mixture comprising components (A) and (B), it is desirable that the above-mentioned EVA is at least 1%, preferably at least 5.5%, BR is at least 11%, preferably at least 13% and $EVA < -3BR + 85$.

Further, known additives such as a plasticizer, stabilizer, lubricant, antistatic agent and coloring agent may be incorporated therein.

The following examples will further illustrate the present invention, wherein parts and percentages are given by weight.

EXAMPLE 1 AND COMPARATIVE EXAMPLE 1

Preparation of component (A)

133 parts of polybutadiene latex having a solid content of 30% and a volume-average particle size of $0.3\mu$ was charged in an autoclave. Then, 120 parts of pure water, 1 part of sodium dodecylbenzenesulfonate, 0.002 parts of ferrous sulfate, 0.004 parts of tetrasodium ethylenediaminetetraacetate and 0.12 parts of sodium aldehyde sulfoxylate were added thereto. The mixture was stirred in a nitrogen atmosphere. The contents of the autoclave were maintained at $60°$ C. and a liquid monomer mixture comprising 45 parts of styrene, 15 parts of acrylonitrile, 0.6 parts of t-dodecylmercaptan and 0.2 parts of benzoyl peroxide was added continuously to the latex over 6 h. After completion of the addition of the monomer mixture, the whole was stirred at $70°$ C. for 2 h to complete the polymerization. Thus, an ABS resin latex [component (A)] was obtained.

Preparation of component (B)

100 parts of pure water, 3.5 parts of partially saponified polyvinyl alcohol and 5 parts of ammonium persulfate were charged in a pressure autoclave. Then, 20 parts of vinyl acetate was added to the mixture under stirring to effect the emulsification. Air in the autoclave was purged with nitrogen gas and then 15 parts of ethylene was introduced therein under pressure. The contents of the autoclave were heated to $50°$ C. and 65 parts of vinyl acetate was added continuously thereto over 8 h. After completion of the addition, the stirring was continued at $70°$ C. for additional 4 h to complete the polymerization. The obtained latex, i.e., component (B), had a volume-average particle size of $0.85\mu$. Component (B) recovered from the latex had a glass transition temperature of $0°$ C.

Preparation of composite ABS resin

Latexes of components (A) and (B) were mixed together in a weight ratio (as solid) as shown in Table 1 and stirred. 30 parts of a 10% aqueous calcium chloride solution was added thereto and the mixture was stirred at 100° C. for 5 min to obtain a polymer mixture in the form of a slurry. It was dehydrated, washed with water and dried to obtain a polymer mixture.

A commercially available acrylonitrile/styrene polymer suspension (acrylonitrile content of 25%; 1% solution in methyl ethyl ketone; relative viscosity rel.$\eta$ at 30° C. of 1.52) in an amount shown in Table 1 was added as component (C) to 100 parts of the polymer mixture and also 0.3 parts of 2,6-di-t-butyl-4-methylphenol and 0.2 parts of triphenyl phosphite were added thereto. The resulting mixture was molten and pelletized by means of an extruder. Test pieces were prepared from the pellets and physical properties thereof were examined to obtain the results shown in Table 1.

In a comparative example, component (A), component (B) and component (C) (AS resin beads) were mixed together in amounts as shown in Table 2. Test pieces were prepared in the same manner as above and physical properties thereof were examined to obtain the results shown in Table 2.

The properties in the examples and comparative examples given herein were determined by the following methods:

| | |
|---|---|
| (1) Tensile strength (yield point): | ASTM D-638 |
| (2) Izod impact strength: | ASTM D-256 |
| (3) Melt flow index: | ASTM D-1238 |
| (4) Gloss: | ASTM D-523 |

The molding was effected at a molding temperature of 230° C. and a mold temperature of 40° C. and the determination was effected at an angle of incidence of 60°.

(5) ESCR (environmental stress crack resistance):

Test pieces having a shape according to JIS K 7113-1 was deflected to the maximum deflection of 50 mm. Chemicals [EG (ethylene glycol monoethyl ether) and AC (glacial acetic acid)] were applied to the deflected portion. The test pieces were left to stand at 23° C. and time (min) required till the rupture was measured.

TABLE 2

| Experiment No. | 12 | 13 | 14 | 15 |
|---|---|---|---|---|
| Component (A) (parts) | 71.5 | 61 | 50 | 45.5 |
| Component (B) (parts) | 28.5 | 39 | 50 | 54.5 |
| Component (C) (parts) (As resin beads) | 186 | 144 | 100 | 82 |
| Polybutadiene content (%) (BR) | 10 | 10 | 10 | 10 |
| Component (B) content (%) (EVA) | 10 | 16 | 25 | 30 |
| Tensile strength (yield point) kg/cm$^2$ | 480 | 450 | 390 | 360 |
| Izod impact strength (kg · cm/cm) | 8.2 | 8.9 | 9.7 | 10 |
| Melt flow index (g/10 min) | 34.8 | 37.2 | 36.5 | 35.1 |
| Gloss (%) | 96.5 | 95.1 | 94.3 | 92.7 |
| ESCR-EG (min) | 23.6 | 61.5 | >120 | >120 |
| ESCR-AC (min) | 11.0 | 32.3 | >120 | >120 |

EXAMPLE 2

100 parts of pure water, 3.5 parts of partially saponified polyvinyl alcohol and 5 parts of ammonium persulfate were charged in a pressure autoclave. Then, 16 parts of vinyl acetate and 10 parts of butyl acrylate were added to the mixture under stirring to effect the emulsification. Air in the autoclave was purged with nitrogen gas and then 20 parts of ethylene was introduced therein under pressure. The inner temperature of the autoclave was elevated to 50° C. and then 54 parts of vinyl acetate was added continuously thereto over 8 h. After completion of the addition, the stirring was continued at 70° C. for additional 24 h to complete the polymerization. The obtained latex, i.e., component (B), had a volume-average particle size of 1$\mu$. The polymer recovered from the latex had a glass transition temperature of $-12°$ C. The obtained latex was mixed with component (A) prepared in Example 1 in a ratio (as solid) as shown in Table 3 while they were maintained in the form of latex and then treated in the same manner as in Example 1 to obtain a polymer mixture.

The resulting polymer mixture was mixed with component (C) [commercially available AS resin beads] in a ratio shown in Table 3 and treated in the same manner as in Example 1. Physical properties examined are shown in Table 3.

TABLE 1

| Experiment No. | 1 | 2 | 3 | 4 | 5 | 6 | 7 | 8 | 9 | 10 | 11 |
|---|---|---|---|---|---|---|---|---|---|---|---|
| Component (A) (parts) | 87.5 | 77 | 70 | 59.5 | 52.5 | 90 | 80 | 70 | 60 | 83 | 75 |
| Component (B) (parts) | 12.5 | 23 | 30 | 40.5 | 47.5 | 10 | 20 | 30 | 40 | 17 | 25 |
| Component (C) (parts) (AS resin beads) | 150 | 120 | 100 | 70 | 50 | 125 | 100 | 75 | 50 | 66 | 50 |
| Polybutadiene content (%) (BR) | 14 | 14 | 14 | 14 | 14 | 16 | 16 | 16 | 16 | 20 | 20 |
| Component (B) content (%) (EVA) | 5 | 10.5 | 15 | 23.8 | 31.7 | 4.4 | 10 | 17.1 | 26.7 | 10.2 | 16.6 |
| Tensile strength (yield point) (kg/cm$^2$) | 450 | 430 | 400 | 360 | 330 | 430 | 410 | 370 | 330 | 360 | 330 |
| Izod impact strength (kg · cm/cm) | 20 | 26 | 28 | 32 | 34 | 29 | 33 | 37 | 39 | 39 | 41 |
| Melt flow index (g/10 min) | 17.8 | 18.2 | 18.8 | 18.3 | 17.9 | 13.2 | 15.6 | 15.2 | 14.4 | 8.2 | 8.0 |
| Gloss (%) | 95.2 | 94.5 | 94.0 | 93.2 | 92.2 | 94.8 | 94.2 | 93.4 | 92.2 | 91.1 | 89.6 |
| ESCR-EG (min) | 8.1 | 29.5 | >120 | >120 | >120 | 12.4 | 54.0 | >120 | >120 | >120 | >120 |
| ESCR-AC (min) | 3.6 | 90.2 | >120 | >120 | >120 | 6.8 | >120 | >120 | >120 | >120 | >120 |

TABLE 3

| Experiment No. | 16 | 17 | 18 | 19 |
|---|---|---|---|---|
| Component (A) (parts) | 90 | 80 | 70 | 60 |
| Component (B) (parts) | 10 | 20 | 30 | 40 |
| Component (C) (parts) (AS resin beads) | 125 | 100 | 75 | 50 |
| Polybutadiene content (%) (BR) | 16 | 16 | 16 | 16 |
| Component (B) content (%) (EVA) | 4.4 | 10 | 17.1 | 26.7 |
| Tensile strength (yield point) (kg/cm$^2$) | 410 | 390 | 350 | 310 |
| Izod impact strength (kg · cm/cm) | 30 | 35 | 39 | 39 |
| Melt flow index (g/10 min) | 12.1 | 14.0 | 13.6 | 12.5 |
| Gloss (%) | 90.5 | 89.4 | 88.6 | 87.5 |
| ESCR-EG (min) | 25.5 | >120 | >120 | >120 |
| ESCR-AC (min) | 10.8 | >120 | >120 | >120 |

EXAMPLE 3

67 parts of polybutadiene latex having a solid content of 30% and volume-average particle size of 0.45μ was charged in an autoclave. Then, 186 parts of pure water, 3 parts of sodium dodecylbenzenesulfonate, 0.002 parts of ferrous sulfate, 0.004 parts of tetrasodium ethylenediaminetetraacetate, 0.12 parts of sodium aldehyde sulfoxylate, 4.8 parts of acrylonitrile, 11.2 parts of styrene, 0.096 parts of t-dodecylmercaptan and 0.03 parts of benzoyl peroxide were added thereto and the mixture was stirred in a nitrogen atmosphere. The contents of the autoclave were heated to 50° C. and maintained at that temperature for 2 h. Then, a monomer mixture comprising 19.2 parts of acrylonitrile, 44.8 parts of styrene, 0.384 parts of t-dodecylmercaptan and 0.12 parts of benzoyl peroxide was added continuously thereto over 8 h. After completion of the addition, the stirring was continued at 70° C. for additional 2 h to complete the polymerization. The obtained component (A) (ABS resin latex) was mixed with component (B) prepared in Example 1 in a ratio (as solid) shown in Table 4 while they were maintained in the form of latex. After thorough stirring, 30 parts of a 10% aqueous calcium chloride solution was added thereto and the mixture was stirred at 100° C. for 5 min to obtain a polymer mixture in the form of a slurry. The product was dehydrated, washed with water and dried to recover a resin. A mixture of 100 parts of the obtained polymer mixture with 0.3 parts of 2,6-di-t-butyl-4-methylphenol and 0.2 parts of triphenyl phosphite was molten and kneaded in an extruder. Test pieces were prepared in the same manner as in Example 1 and physical properties thereof were examined to obtain the results shown in Table 4.

TABLE 4

| Experiment No. | 20 | 21 | 22 | 23 |
|---|---|---|---|---|
| Component (A) (parts) | 95 | 90 | 85 | 80 |
| Component (B) (parts) | 5 | 10 | 15 | 20 |
| Polybutadiene content (%) (BR) | 19 | 18 | 17 | 16 |
| Component (B) content (%) (EVA) | 5 | 10 | 15 | 20 |
| Tensile strength (yield point) (kg/cm$^2$) | 380 | 360 | 330 | 310 |
| Izod impact strength (kg · cm/cm) | 28 | 32 | 36 | 37 |
| Melt flow index (g/10 min) | 6.3 | 9.7 | 12.5 | 14.0 |
| Gloss (%) | 89.5 | 91.1 | 92.3 | 91.6 |
| ESCR-EG (min) | 32.6 | >120 | >120 | >120 |
| ESCR-AC (min) | 25.5 | >120 | >120 | >120 |

COMPARATIVE EXAMPLE 2

100 parts of pure water, 3.5 parts of partially saponified polyvinyl alcohol and 5 parts of ammonium persulfate were charged in a pressure autoclave. Then, 50 parts of vinyl acetate was added thereto under stirring to effect the emulsification. Air in the autoclave was purged with nitrogen gas and then the contents thereof were heated to 50° C. 50 parts of vinyl acetate was added continuously thereto over 8 h. After completion of the addition, the stirring was continued at 70° C. for 4 h to complete the polymerization. The obtained vinyl acetate polymer latex had a volume-average particle size of 0.8μ. The polymer recovered from the latex had a glass transition temperature of 26° C. 20 parts (as solid) of the obtained component (B) latex was mixed with 80 parts (as solid) of component (A) latex prepared in Example 1 while they were maintained in the form of latex and then treated in the same manner as in Example 1 to obtain a polymer mixture. 100 parts of the polymer mixture was mixed with 100 parts of commercially available AS resin beads and treated in the same manner as in Example 1 to obtain composite ABS resin moldings. Physical properties of the moldings were examined to obtain the results shown in Table 5 (see Experiment No. 24).

COMPARATIVE EXAMPLE 3

100 parts of pure water, 3.5 parts of partially saponified polyvinyl alcohol and 5 parts of ammonium persulfate were charged in a pressure autoclave. Then, 50 parts of vinyl acetate was added thereto under stirring to effect the emulsification. Air in the autoclave was purged with nitrogen gas and 50 parts of ethylene was introduced therein under pressure. The contents of the autoclave were stirred at a temperature kept at 50° C. for 8 h. Then, the stirring was continued at 70° C. for 4 h to complete the polymerization. The obtained component (B) latex had a volume-average particle size of 0.9μ. The polymer recovered from the latex had a glass transition temperature of −48° C. The component (B) latex obtained as above was treated in the same manner as in Comparative Example 2 and physical properties thereof were examined to obtain the results shown in Table 5 (see Experiment No. 25).

COMPARATIVE EXAMPLE 4

230 parts of pure water, 8 parts of sodium dodecylbenzenesulfonate and 5 parts of ammonium persulfate were charged in a pressure autoclave and stirred. Air in the autoclave was purge with nitrogen and 15 parts of ethylene was introduced therein under pressure. The contents of the autoclave were heated to 50° C. and 85 parts of vinyl acetate was added continuously thereto over 10 h. After completion of the addition, the starting was continued at 70° C. for additional 4 h to complete the polymerization. The obtained component (B) latex had a volume-average particle size of 0.38μ. The polymer recovered from the latex had a glass transition temperature of 0° C. The component (B) latex obtained as above was treated in the same manner as in Comparative Example 2 and physical properties thereof were examined to obtain the results shown in Table 5 (see Experiment No. 26).

COMPARATIVE EXAMPLE 5

30 parts of a 10% aqueous calcium chloride solution was added to 100 parts (on dry weight basis) of component (A) latex obtained in Example 1 and the mixture was stirred at 100° C. for 5 min to obtain a slurry. The slurry was then dehydrated, washed with water and dried to recover a solid resin. On the other hand, component (B) latex obtained in Example 1 was frozen at −30° C. and the resulting precipitate was dehydrated, washed with water and dried to recover a polymer. 80 parts of component (A) and 20 parts of component (B) thus recovered separately from each other were mixed with 100 parts of component (C) (commercially available AS resin beads), 0.3 parts of 2,6-di-t-butyl-4-methylphenol and 0.2 parts of triphenyl phosphite. The mixture was molten and kneaded in an extruder to obtain composite ABS resin in the form of pellets. Test pieces were prepared from the pellets and physical properties thereof were examined to obtain the results shown in Table 5 (see Experiment No. 27).

COMPARATIVE EXAMPLE 6

Component (A) recovered from the latex in Comparative Example 5 was mixed with component (C) (ABS resin beads) in a ratio shown in Table 5. The mixture was treated in the same manner as in Example 1 and physical properties thereof were examined to obtain the results shown in Table 5 (see Experiments Nos. 28–31).

TABLE 5

| Experiment No. | 24 | 25 | 26 | 27 | 28 | 29 | 30 | 31 |
| --- | --- | --- | --- | --- | --- | --- | --- | --- |
| Component (A) (parts) | 80 | 80 | 80 | 80 | 100 | 100 | 100 | 100 |
| Component (B) (parts) | 20 | 20 | 20 | 20 | 0 | 0 | 0 | 0 |
| Component (C) (parts) (AS resin beads) | 100 | 100 | 100 | 100 | 300 | 186 | 150 | 100 |
| Polybutadiene content (%) (BR) | 16 | 16 | 16 | 16 | 10 | 14 | 16 | 20 |
| Component (B) content (%) (EVA) | 10 | 10 | 10 | 10 |  |  |  |  |
| Tensile strength (yield point) (kg/cm$^2$) | 430 | 320 | 410 | 400 | 500 | 460 | 440 | 400 |
| Izod impact strength (kg · cm/cm) | 16 | 30 | 22 | 26 | 7.2 | 20 | 24 | 26 |
| Melt flow index (g/10 min) | 15.9 | 5.6 | 13.5 | 14.8 | 36.4 | 24.6 | 14.9 | 6.6 |
| Gloss (%) | 92.8 | 38.0 | 94.4 | 93.6 | 97.5 | 96.0 | 95.1 | 93.5 |
| ESCR-EG (min) | 28.6 | 11.9 | 31.5 | 35.2 | 0.7 | 0.8 | 1.0 | 1.45 |
| ESCR-AC (min) | >120 | >120 | >120 | >120 | 0.1 | 0.1 | 0.1 | 0.1 |

What is claimed is:

1. A thermoplastic resin composition obtained by mixing:
   (A) a graft copolymer latex obtained by the copolymerization of a rubbery diene polymer latex with an aromatic vinyl monomer and an acrylic monomer with
   (B) a copolymer latex obtained by the emulsion polymerization of an olefin monomer with a monomeric vinyl ester of fatty acid and, optionally, a vinyl monomer copolymerizable with them the copolymer having a glass transition temperature of −40° to 10° C. and a volume-average particle size of at least 0.5μ, in the form of a latex to precipitate a solid resin, in which composition, the amount of the solid resin (EVA) in component (B) is at least 1 wt. % based on the total solid resin and that of the solid rubbery diene polymer (BR) is at least 11 wt % and which composition satisfies the following relationship:

$$EVA < -3BR + 85$$

2. A thermoplastic resin composition obtained by mixing:
   (A) a graft copolymer latex obtained by the copolymerization of a rubbery diene polymer latex with an aromatic vinyl monomer and an acrylic monomer with
   (B) a copolymer latex obtained by the emulsion polymerization of an olefin monomer with a monomeric vinyl ester of fatty acid and, optionally, a vinyl monomer copolymerizable with them the copolymer having a glass transition temperature of −40° to 10° C. and a volume-average particle size of at least 0.5μ, in the form of a latex to precipitate a solid resin and then incorporating a copolymer [component (C)] of an acrylic monomer and an aromatic vinyl monomer therein, in which composition, the amount of the solid resin (EVA) in component (B) is at least 1 wt.% based on the total solid resin and that of the solid rubbery diene polymer (BR) is at least 11 wt.% and which composition satisfies the following relationship:

$$EVA < -3BR + 85.$$

3. The thermoplastic resin composition of claim 1 wherein the amount of the solid resin (EVA) in said component (B) is at least 5.5% by weight.

4. The thermoplastic resin composition of claim 2 wherein the amount of the solid resin (EVA) in said component (B) is at least 5.5% by weight.

5. The thermoplastic resin composition of claim 1 wherein said component (A) is a grafted copolymer latex obtained by copolymerizing styrene and acrylonitrile on a polybutadiene latex.

6. The thermoplastic resin composition of claim 2 wherein said component (A) is a grafted copolymer latex obtained by copolymerizing styrene and acrylonitrile on a polybutadiene latex.

7. The thermoplastic resin composition of claim 1 wherein said component (A) is a grafted copolymer latex obtained by copolymerizing styrene, α-methylstyrene and acrylonitrile on a polybutadiene latex.

8. The thermoplastic resin composition of claim 2 wherein said component (A) is a grafted copolymer latex obtained by copolymerizing styrene, α-methylstyrene and acrylonitrile on a polybutadiene latex.

9. The thermoplastic resin composition of claim 1 wherein said component (B) is a copolymer latex of ethylene and vinyl acetate.

10. The thermoplastic resin composition of claim 2 wherein said component (B) is a copolymer latex of ethylene and vinyl acetate.

11. The thermoplastic resin composition of claim 1 wherein said component (B) is a copolymer latex of ethylene, vinyl acetate and butyl acrylate.

12. The thermoplastic resin composition of claim 2 wherein said component (B) is a copolymer latex of ethylene, vinyl acetate and butyl acrylate.

13. The thermoplastic resin composition of claim 1 wherein said component (B) is a copolymer latex of ethylene, vinyl acetate and ethyl acrylate.

14. The thermoplastic resin composition of claim 2 wherein said component (B) is a copolymer latex of ethylene, vinyl acetate and ethyl acrylate.

15. The thermoplastic resin composition of claim 2 wherein said component (C) is a copolymer of styrene and acrylonitrile.

16. The thermoplastic resin composition of claim 2 wherein said component (C) is a copolymer of styrene, α-methylstyrene and acrylonitrile.

17. The thermoplastic resin composition of claim 2 wherein the copolymer of said component (C) has a relative viscosity (1% solution in methyl ethyl ketone, at 30° C.) of 1.52 or more.

18. The thermoplastic resin composition of claim 1 further containing phosphorous acid esters as a stabilizer.

19. The thermoplastic resin composition of claim 2 further containing phosphorous acid esters as a stabilizer.

* * * * *